(No Model.)

H. W. BRIDGMAN.
CHOPPING KNIFE AND SLICER.

No. 387,047. Patented July 31, 1888.

WITNESSES:

INVENTOR,
H. W. Bridgman,
BY Munn & Co.
ATTORNEY,

UNITED STATES PATENT OFFICE.

HARVEY W. BRIDGMAN, OF LYONS, KANSAS.

CHOPPING-KNIFE AND SLICER.

SPECIFICATION forming part of Letters Patent No. 387,047, dated July 31, 1888.

Application filed April 5, 1888. Serial No. 269,697. (No model.)

*To all whom it may concern:*

Be it known that I, HARVEY W. BRIDGMAN, of Lyons, in the county of Rice and State of Kansas, have invented a new and Improved Chopping-Knife and Slicer, of which the following is a full, clear, and exact description.

This invention relates to chopping-knives, and has for its object to provide a chopping-knife by means of which the chopping may be done in a thorough and effective manner, and which may also be used for slicing as well as chopping.

The invention will be set forth in the following description, and pointed out in the claims.

Reference is to be had to the accompanying drawings, forming a part of this specification, in which similar figures of reference indicate corresponding parts in both the views.

Figure 1:
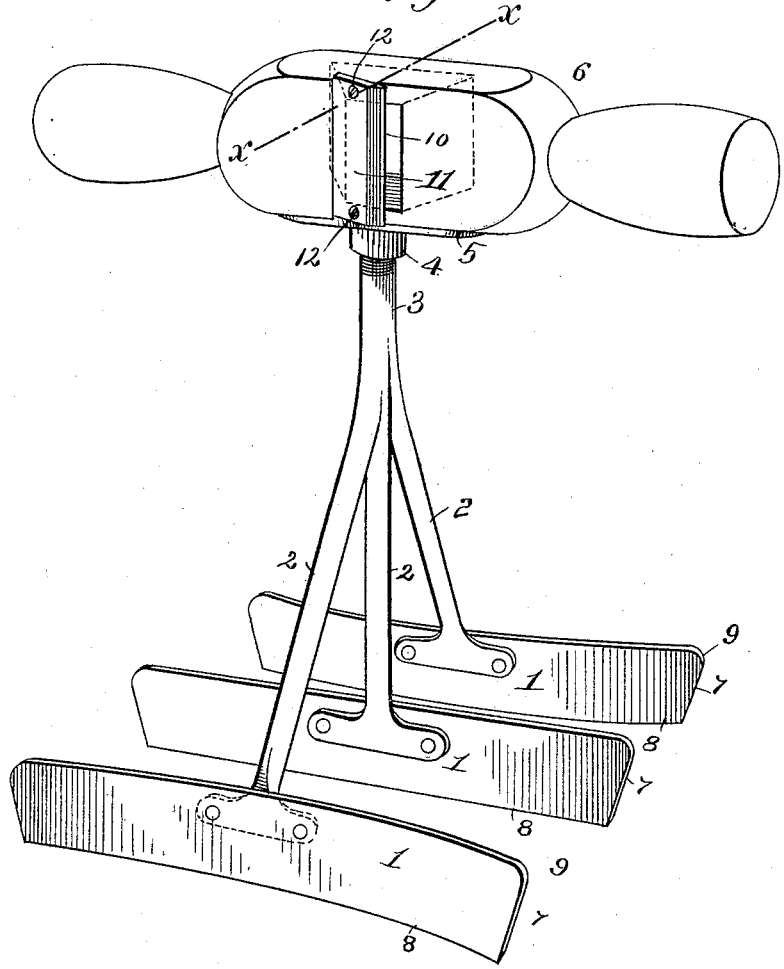
Figure 2:
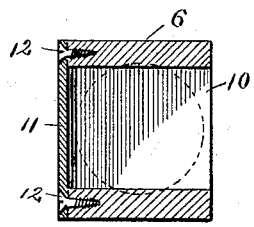

Figure 1 is a perspective view of the invention; and Fig. 2 is a detail in section on the line x x, Fig. 1.

In the construction of this device a number of blades, 1, are mounted on arms 2 of a shank, 3, screwed to a socket, 4, on a plate, 5, fastened to a handle, 6. The blades 1 are formed with converging taper ends 7, so that their upper edge is longer than their lower or cutting edge, 8. By means of this construction the cutting-edge 8 is prevented from cutting and chipping off the sides of a wooden vessel containing the material being chopped, and thereby causing bits of wood to be mingled with the chopped material, as in the downward movement of the chopper the upper corners, 9, of the blade would hit the side of the vessel first and act as fenders to keep off the cutting-edge. The blades 1 are also curved horizontally, so that the outer ends of each blade are farther apart from the outer ends of the adjacent blade than the central portions of the contiguous blades are from each other. By means of this construction the tendency of the material being chopped to pack between the blades is obviated, and a larger area of chopping-surface is attained.

For the sake of convenience and utility, the handle 6 is formed with an opening or passage-way, 10, across one end of which is located a slicing-blade, 11, secured to the handle 6 by screws 12, or in any other suitable manner.

As the chopper is used to chop meat, vegetables, &c., and the vegetables are often sliced first preparatory to chopping, the slicing-blade 11 is conveniently at hand on the handle 6 for slicing through the opening 10. If desired, the slicer may be used independently of the chopper by removing the handle 6 from the shank 3.

By means of this invention a chopping-knife is provided which will answer the purpose of a chopping-machine employing geared mechanism.

Having thus described my invention, what I claim as new, and desire to secure by Letters Patent, is—

1. A chopping-knife consisting of a handle having a transverse opening and a slicing-blade extending across one end of the opening, and a shank with arms on which are mounted chopping-blades, substantially as shown and described.

2. A chopping-knife consisting of a handle having a shank with arms, and chopping-blades mounted thereon, the ends of the blades being formed with converging edges, substantially as shown and described.

3. A chopping-knife consisting of handle 6, having secured thereto shank 3, with arms 2, and curved blades 1, secured to arms 2, with converging taper ends 7, the outer ends of the adjacent blades being farther apart than the central portions, substantially as shown and described.

HARVEY W. BRIDGMAN.

Witnesses:
 D. P. HODGDEN,
 J. S. MADERIS.